United States Patent
Kurihara

(10) Patent No.: US 9,349,221 B2
(45) Date of Patent: May 24, 2016

(54) PRINTER APPARATUS AND CONTROL METHOD THEREFOR

(71) Applicant: FUJITSU FRONTECH LIMITED, Inagi-shi, Tokyo (JP)

(72) Inventor: Makoto Kurihara, Inagi (JP)

(73) Assignee: FUJITSU FRONTECH LIMITED, Tokyo (JP)

( * ) Notice: Subject to any disclaimer, the term of this patent is extended or adjusted under 35 U.S.C. 154(b) by 0 days.

(21) Appl. No.: 14/731,706

(22) Filed: Jun. 5, 2015

(65) Prior Publication Data
US 2016/0027222 A1    Jan. 28, 2016

(30) Foreign Application Priority Data

Jul. 25, 2014   (JP) ................................ 2014-151305

(51) Int. Cl.
   *G06F 3/12*      (2006.01)
   *G06K 15/00*     (2006.01)
   *G07B 1/00*      (2006.01)
   *G06K 15/02*     (2006.01)
   *G06K 15/16*     (2006.01)

(52) U.S. Cl.
   CPC ............... *G07B 1/00* (2013.01); *G06K 15/021* (2013.01); *G06K 15/16* (2013.01); *G06K 15/4065* (2013.01)

(58) Field of Classification Search
   None
   See application file for complete search history.

(56) References Cited

U.S. PATENT DOCUMENTS

| | | | | |
|---|---|---|---|---|
| 4,858,123 A | * | 8/1989 | Alexoff | A63F 3/065 101/484 |
| 2009/0245914 A1 | | 10/2009 | Shibasaki et al. | |
| 2011/0204077 A1 | * | 8/2011 | Gu | B65H 35/06 221/30 |
| 2012/0257250 A1 | * | 10/2012 | Cong | G07B 1/00 358/1.15 |

FOREIGN PATENT DOCUMENTS

| | | |
|---|---|---|
| JP | 11-003442 A | 1/1999 |
| JP | 2007-128309 A | 5/2007 |
| JP | 2009-245013 A | 10/2009 |

\* cited by examiner

*Primary Examiner* — Dov Popovici
(74) *Attorney, Agent, or Firm* — Westerman, Hattori, Daniels & Adrian, LLP

(57) ABSTRACT

When a medium is set to a printer apparatus, a first printing condition for a longer boarding ticket of two types of boarding ticket length is read and set, the medium is started to be conveyed. Upon detection of a cue mark of the medium, the medium is advanced by a predetermined distance and the apparatus is set to a print-standby state of a second boarding ticket to wait to receive data. Upon reception of first printing data, printing is started under the first printing condition. When the cue mark is detected, if printing is completed, subsequent printing is performed under the first printing condition. If the cue mark is detected before printing is completed, a second printing condition for a shorter boarding ticket is read and set and the printing is performed under the second printing condition.

6 Claims, 8 Drawing Sheets

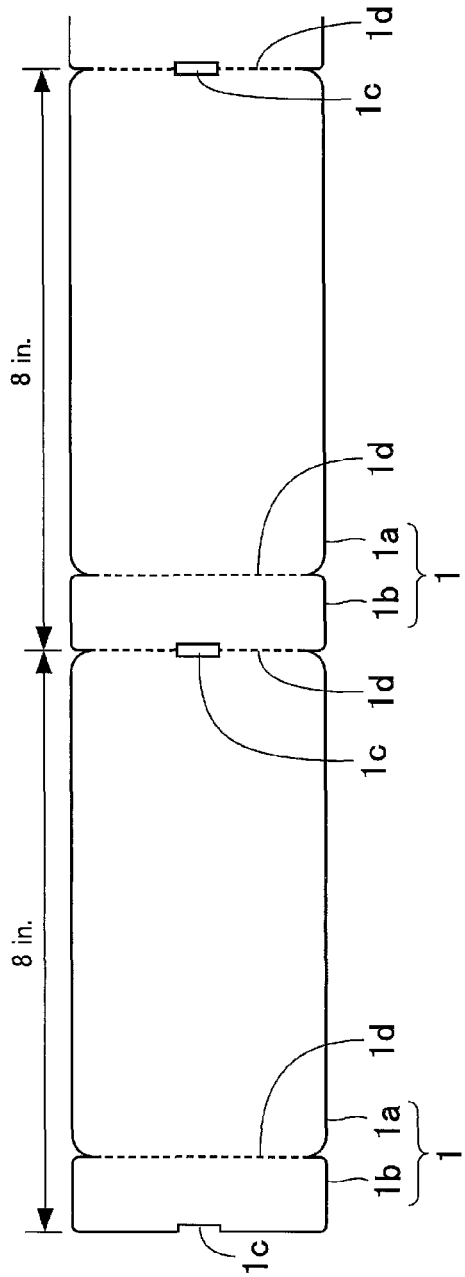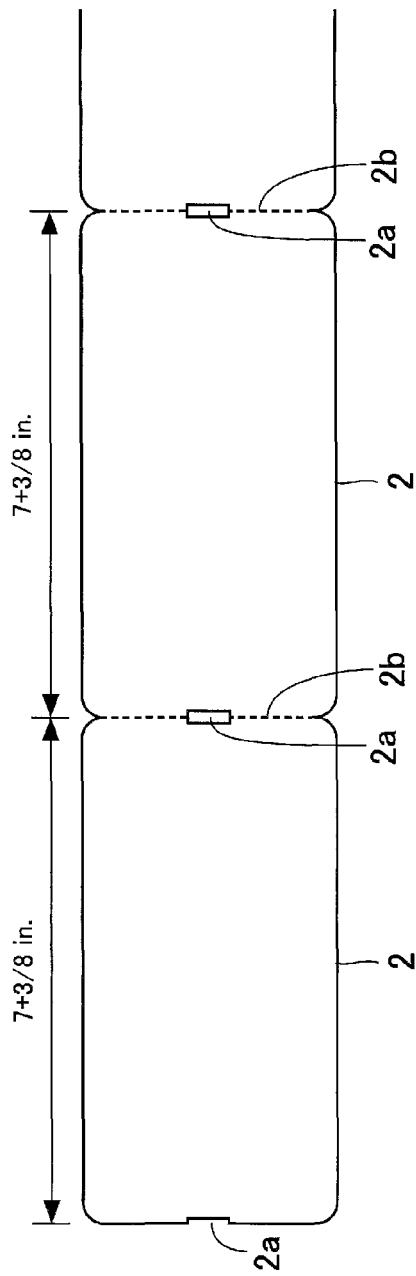

US 9,349,221 B2

PRINTER APPARATUS AND CONTROL METHOD THEREFOR

CROSS-REFERENCE TO RELATED APPLICATION

This application is based upon and claims the benefit of priority of the prior Japanese Patent Application No. 2014-151305, filed on Jul. 25, 2014, the entire contents of which are incorporated herein by reference.

FIELD

The embodiment discussed herein relates to a printer apparatus, and a control method and print control program therefor.

BACKGROUND

In performing the boarding procedure of an airplane at a reception counter in an airport, a boarding ticket on which a seat number and the like are printed is issued. As the boarding ticket, media with two types of boarding ticket length are usually circulated. Specifically, there are a boarding ticket with 8 in. (20.32 cm) length (hereinafter, sometimes referred to as a first boarding ticket length) and a boarding ticket with 7+/8 in. (18.73 cm) length (hereinafter, sometimes referred to as a second boarding ticket length). In the respective airlines, whether a boarding ticket with the first boarding ticket length or a boarding ticket with the second boarding ticket length is used is determined in advance.

Here, in a printer apparatus installed on a common counter jointly used by a plurality of airlines, every time a person in charge uses the counter, the person starts with setting a brought-in own airline's medium to the printer apparatus and keeping the printer apparatus in a printable state.

Because a boarding ticket medium has a long shape including a plurality of unprinted boarding tickets continuous in a longitudinal direction, the printer apparatus needs to recognize the boarding ticket length of the set medium when the medium is set to the printer apparatus.

Therefore, a high-functional printer apparatus has a function to measure, when a medium is set, the boarding ticket length while conveying the set medium forward (see, for example, Japanese Laid-open Patent Publication No. 2007-128309). Once the boarding ticket length is measured, the printer apparatus brings the medium back to a print start position of the first boarding ticket, sets a printing condition for the measured boarding ticket length, and enters a print-standby state. Such a printer apparatus becomes costly because it has a function to switchably convey a medium forward or backward.

In contrast, a printer apparatus has been developed which attempts to achieve a reduction in cost with limited features. Even such a printer apparatus is naturally able to handle a boarding ticket medium with the first boarding ticket length and a boarding ticket medium with the second boarding ticket length.

FIG. 6 is a cross sectional view illustrating the configuration example of an existing printer apparatus, and FIG. 7 is a flow chart illustrating the operational flow of the existing printer apparatus until it is set to the print-standby state. FIGS. 8A to 8D illustrate the operation of the existing printer apparatus until it is set to the print-standby state, where FIG. 8A illustrates a state where a medium is set, FIG. 8B illustrates a state where the second boarding ticket is set at a cueing position, FIG. 8C illustrates a state where the length of the second boarding ticket is measured, and FIG. 8D illustrates the print-standby state.

A printer apparatus 100 includes, as illustrated in FIG. 6, a print head 102 above a conveyance path on which a medium 101 is conveyed, and a platen roller 103 at a position facing the print head 102 across the conveyance path. The printer apparatus 100 also includes a sensor 104 close to the upstream side of the print head 102 and platen roller 103 on the conveyance path. The printer apparatus 100 further includes, although not illustrated, a data receiving unit configured to receive data to be printed by the print head 102 and a control unit configured to control the print head 102, platen roller 103, and sensor 104.

The print head 102 prints, when print data has been sent from a host apparatus (host computer) connected to the printer apparatus 100, the print data onto a boarding ticket. The platen roller 103 supports the boarding ticket from the back side thereof when the print head 102 performs printing, and also feeds (conveys only in one direction) the boarding ticket by a printing pressure that is applied to the print head 102 toward the platen roller 103. The sensor 104 detects a cue mark that is formed at a joint between the adjacent boarding tickets on the medium 101.

Next, the operation until the printer apparatus 100 is set to the print-standby state is described. The control of this operation is performed by a non-illustrated control unit. First, as illustrated in FIG. 7, the medium 101 is set to the printer apparatus 100 (step S101). Because the printer apparatus 100 includes only the platen roller 103 as the conveyance unit of the medium 101, the upper part including the print head 102 is opened to expose the platen roller 103 and the medium 101 is set so as to be placed on the platen roller 103. Subsequently, once the upper part of the printer apparatus 100 is closed, a state is set where the first boarding ticket of the medium 101 is placed on the platen roller 103, as illustrated in FIG. 8A.

Next, the platen roller 103 is driven to rotate counterclockwise and conveyance of the medium 101 is started in an ejection direction (toward the left of the view) (step S102), and then the cue mark of the medium 101 is detected by the sensor 104 while the medium 101 is being conveyed (step S103). Once the cue mark is detected as illustrated in FIG. 8B, the sensor 104 starts measuring the length of the second boarding ticket of the medium 101 (step S104).

In this case, while the medium 101 is being conveyed, the cue mark of the medium 101 is also detected by the sensor 104 (step S105). Once the cue mark is detected as illustrated in FIG. 8C, the medium 101 is conveyed by a predetermined distance in the ejection direction, and the second boarding ticket not separated from the first boarding ticket is ejected, and then the third boarding ticket is set at a cueing position. At this point, the measurement of the boarding ticket length of the medium 101 is completed (step S106). Thus, the printer apparatus 100 is ready to start printing from the third boarding ticket set at the cueing position, using the measured boarding ticket length as the printing condition and transitions to the print-standby state. In this print-standby state, as illustrated in FIG. 8D, the already fed and ejected first and second boarding tickets are discarded. Thus, the printer apparatus 100 sets the printing condition to the measured boarding ticket length, and enters the print-standby state. Subsequently, when print data is sent from the host apparatus, the printer apparatus 100 prints the received print data onto the boarding ticket under the set printing condition.

In the existing printer apparatus whose features are limited so as to allow one-way-only conveyance, after a medium is set, the first boarding ticket is conveyed to the ejection position in order to set the second boarding ticket at a cueing position, then the boarding ticket length is measured using the second boarding ticket, and subsequently, the third boarding ticket is set to the print-standby state. Therefore, there is a problem that after the medium is set to the printer apparatus, before the printer apparatus is set to the print-standby state, two boarding tickets are always discarded.

SUMMARY

According to an aspect, there is provided a printer apparatus that performs printing for each unprinted ticket on a medium including a plurality of continuous unprinted tickets each having a first ticket length or a second ticket length shorter than the first ticket length, the printer apparatus including: a storage unit configured to store a first printing condition for the first ticket length and a second printing condition for the second ticket length; a sensor unit configured to detect a cue mark that is formed at a joint between adjacent unprinted tickets of the medium; a conveyance unit configured to convey the medium; a data receiving unit configured to receive printing data from a host apparatus; a printing unit configured to print the received printing data onto the unprinted ticket in accordance with the first printing condition or second printing condition stored in the storage unit; and a control unit configured to control the conveyance unit so as to start conveying the medium when the medium is set or when the data receiving unit receives the printing data and the printing unit starts printing, and so as to stop conveying the medium at a print waiting position of the medium when the sensor unit detects the cue mark, wherein the control unit sets a printing condition to the first printing condition when the medium is set, starts printing the printing data under the set printing condition when the data receiving unit receives the printing data, and re-sets the printing condition to the second printing condition and prints the received printing data under the re-set printing condition when the sensor unit detects the cue mark prior to completion of the printing.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 1A and 1B illustrate the types of an airplane boarding ticket, where FIG. 1A illustrates the boarding ticket with a first boarding ticket length and FIG. 1B illustrates the boarding ticket with a second boarding ticket length;

FIG. 8A illustrates a state where a medium is set, FIG. 8B illustrates a state where the second boarding ticket is set at a cueing position, FIG. 8C illustrates a state where the length or the second boarding ticket is being measured, and FIG. 8D illustrates the print-standby state.

DESCRIPTION OF EMBODIMENTS

Figure 2:
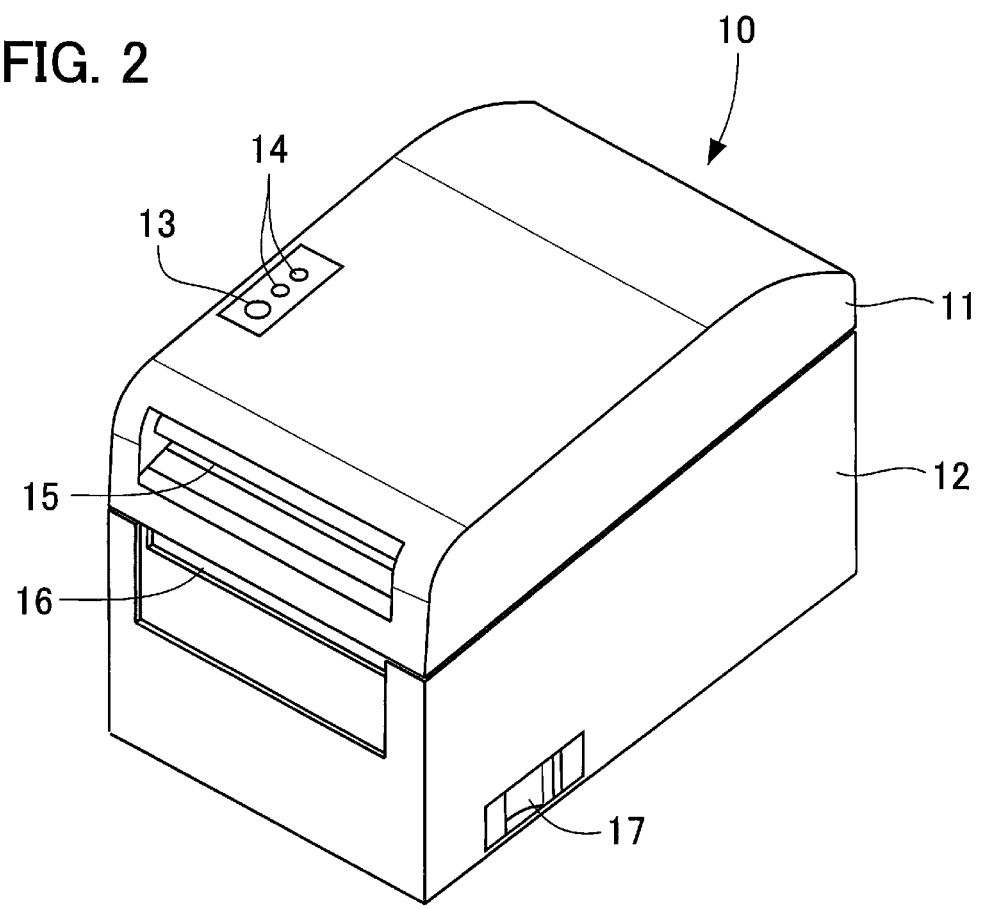
FIG. 2 illustrates an external view of a printer apparatus for printing a boarding ticket.

An embodiment will be described below with reference to the accompanying drawings, wherein like reference numerals refer to like elements throughout. Here, the embodiment applied to a printer apparatus for printing a boarding ticket, whose features are limited so as to allow one-way-only conveyance of a medium but not allow an opposite-direction conveyance of the medium, is described as an example.

Note that, the embodiment will be described using an airplane boarding ticket as an example, but not limited thereto. For example, the embodiment is applicable also to the tickets and/or reserved seat tickets for other transportations (train, bus, and the like), the ticket for a concert, the admission tickets for facilities, and the like. Accordingly, the embodiment is applicable to the printer apparatuses that use a continuous medium and issue various kinds of tickets.

Figure 3:
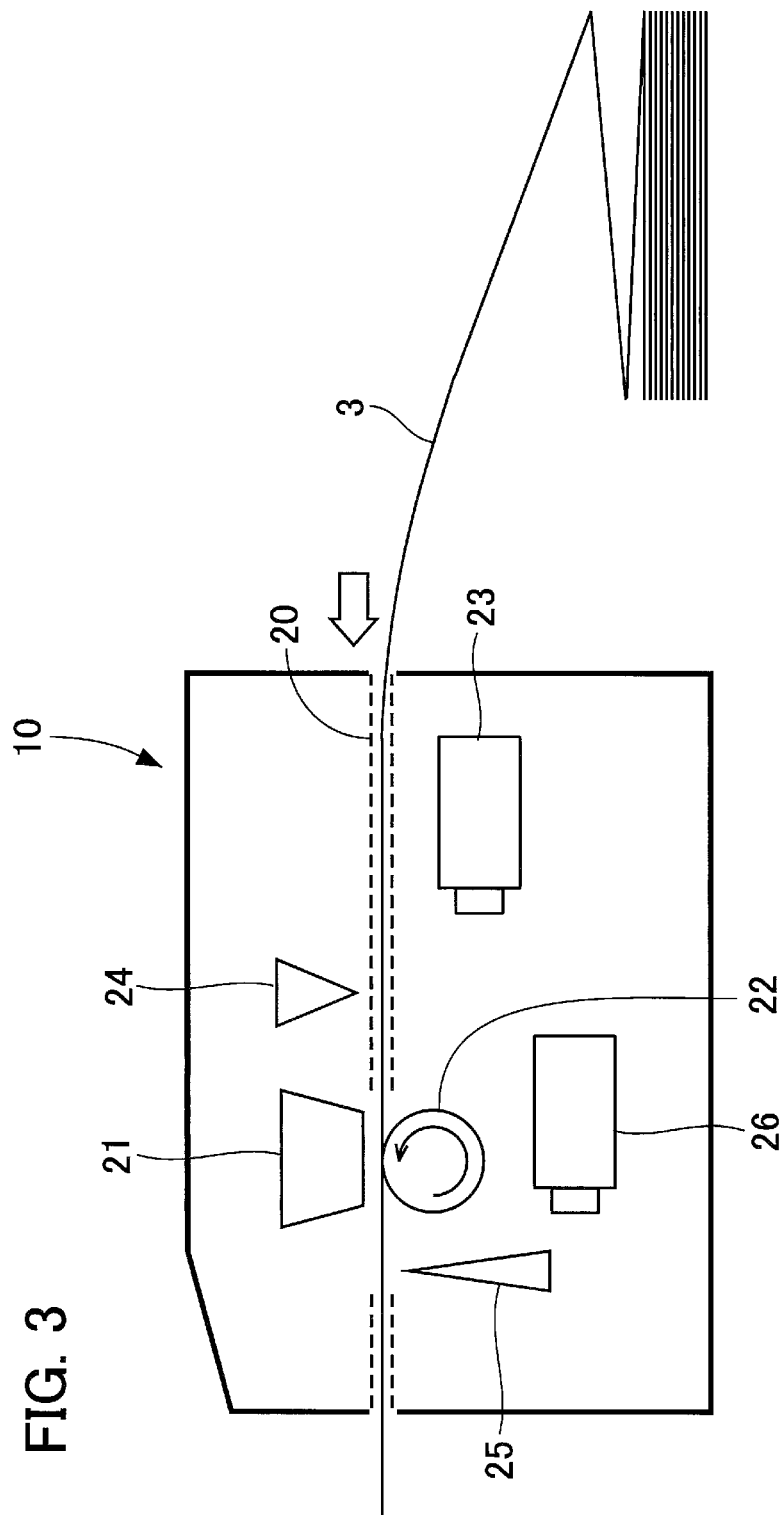
FIG. 3 is a cross sectional view illustrating the internal configuration of the printer apparatus for printing a boarding ticket.

FIGS. 1A and 1B illustrate the types of an airplane boarding ticket, where FIG. 1A illustrates the boarding ticket with a first boarding ticket length and FIG. 1B illustrates the boarding ticket with a second boarding ticket length. FIG. 2 illustrates an external view of a printer apparatus for printing a boarding ticket. FIG. 3 is a cross sectional view illustrating the internal configuration of the printer apparatus for printing a boarding ticket.

With regard to the airplane boarding ticket, there are a boarding ticket 1 with a first boarding ticket length (8 in.) as illustrated in FIG. 1A and a boarding ticket 2 with a second boarding ticket length (7+⅜in.) as illustrated in FIG. 1B.

The boarding ticket 1 includes a main body portion 1a and a stub portion (tag end) 1b, and the main body portion 1a and the stub portion 1b constitute one boarding ticket. The boarding ticket 1 continues in the longitudinal direction to constitute a long medium, in which a cue mark 1c is punched at the center of the joint between the adjacent boarding tickets 1. Moreover, at the position of the joint between the adjacent boarding tickets 1 and at a position of the joint between the main body portion 1a and the stub portion 1b, a perforated line 1d is provided so that the boarding ticket 1 may foe easily separated from the medium and the stub portion 1b may be easily separated from the boarding ticket 1.

On the other hand, the boarding ticket 2 with the second boarding ticket length continues in the longitudinal direction to constitute a long medium, where a cue mark 2a is punched at the center of the joint between the adjacent boarding tickets 2. Moreover, a perforated line 2b is provided at the position of the joint between the adjacent boarding tickets 2.

Such a boarding ticket 1 or boarding ticket 2 is set, in the state of the medium, to the printer apparatus 10 and is printed. The printer apparatus 10 includes a cover section 11 and a main body section 12 as illustrated in FIG. 2. A medium feeding button 13 and two lamps 14 are provided in the top face of the cover section 11. The medium feeding button 13 is used in feeding the set medium as needed. The lamps 14 are light-emitting indicators, one of which is turned on when an error occurs and the other one is turned on when the medium runs out.

The cover section 11 also has a lever 15 provided in front thereof (in the lower left direction of the view). The cover section 11 is pivotally supported by the main body section 12 at the back of the printer apparatus 10 so as to be opened when the medium is set or inspected, for example. Moreover, the cover section 11 is locked to the illustrated state, when closed. Furthermore, the lock is released by pressing and raising the lever 15, so that the cover section 11 may be opened.

The main body section 12 has a medium ejection port 16 provided in the upper portion on the front side thereof. When the boarding ticket 1 or boarding ticket 2 is printed or when the medium feeding button 13 on the top face of the cover section 11 is pushed, the medium is ejected from the medium ejection port 16. Moreover, a power switch 17 is provided on one side of the main body section 12.

Moreover, the printer apparatus 10 includes, as illustrated in FIG. 3, a print head 21 on the cover-section 11 side of the upper portion of a conveyance path 20 on which the medium 3 of the boarding ticket 1 or the boarding ticket 2 is conveyed, and further includes a platen roller 22 at the position facing the print head 21 across the conveyance path 20. The platen roller 22 is rotatably supported in a direction (toward the left of the view) along which the medium 3 is fed by a medium conveying motor 23. The printer apparatus 10 also includes a sensor 24 close to the upstream side of the print head 21 and platen roller 22 on the conveyance path 20. The sensor 24 may be a light transmission type sensor, for example, and is used for detecting the cue mark 1c or cue mark 2a formed in the medium 3. The printer apparatus 10 further includes, as needed, a cutter 25 in the vicinity of a medium exit port of the conveyance path 20 and a cutter drive motor 26 which performs an elevating operation (cutting operation of the medium 3) of the cutter 25. The cutter 25 cuts the medium 3 along the perforated line 1d or perforated line 2b in place of an operator, and operates in conjunction with the detection of the cue mark 1c or cue mark 2a of the medium 3 by the sensor 24.

Note that, in the medium 3, the unprinted boarding tickets 1 or boarding tickets 2 are folded along the perforated line 1d having the cue mark 1c in the case of the boarding ticket 1, and along the perforated line 2b having the cue mark 2a in the case of the boarding ticket 2. The medium 3 is set to the printer apparatus 10 by pulling out the boarding ticket 1 or boarding ticket 2 present on the top of the folded medium 3, placing a part thereof onto the platen roller 22, and furthermore pressing the medium 3 on the platen roller 22 with the print head 21.

Next, the function of the printer apparatus 10 and the control action thereof will be described.

Figure 4:
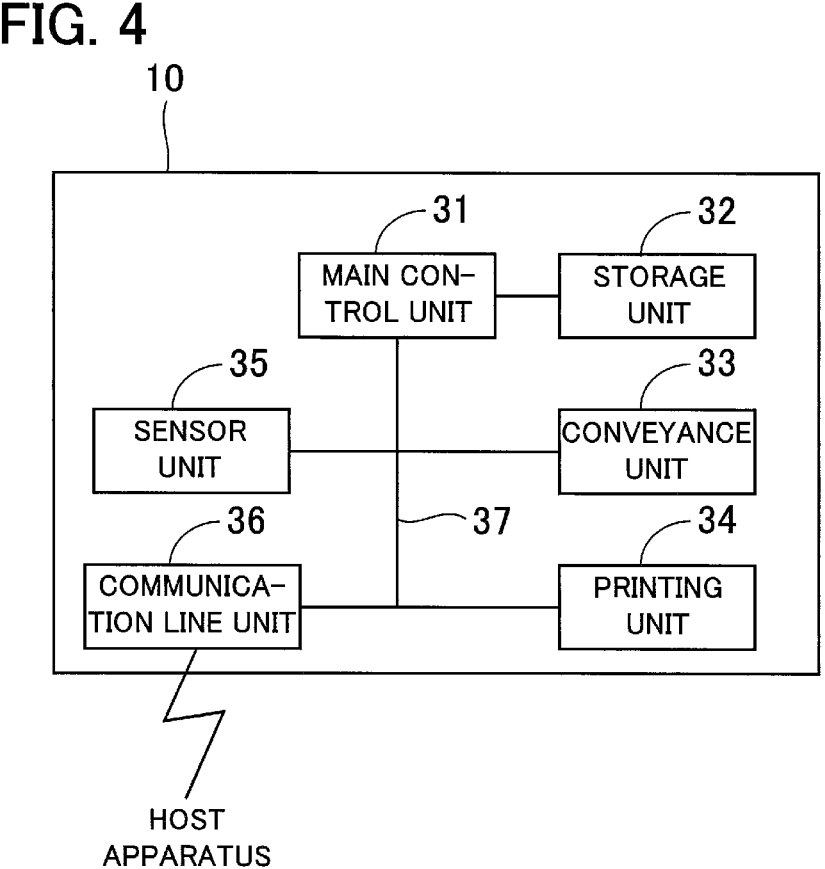
FIG. 4 is a block diagram illustrating one example of a hardware configuration of a printer apparatus used in the embodiment.
Figure 5:
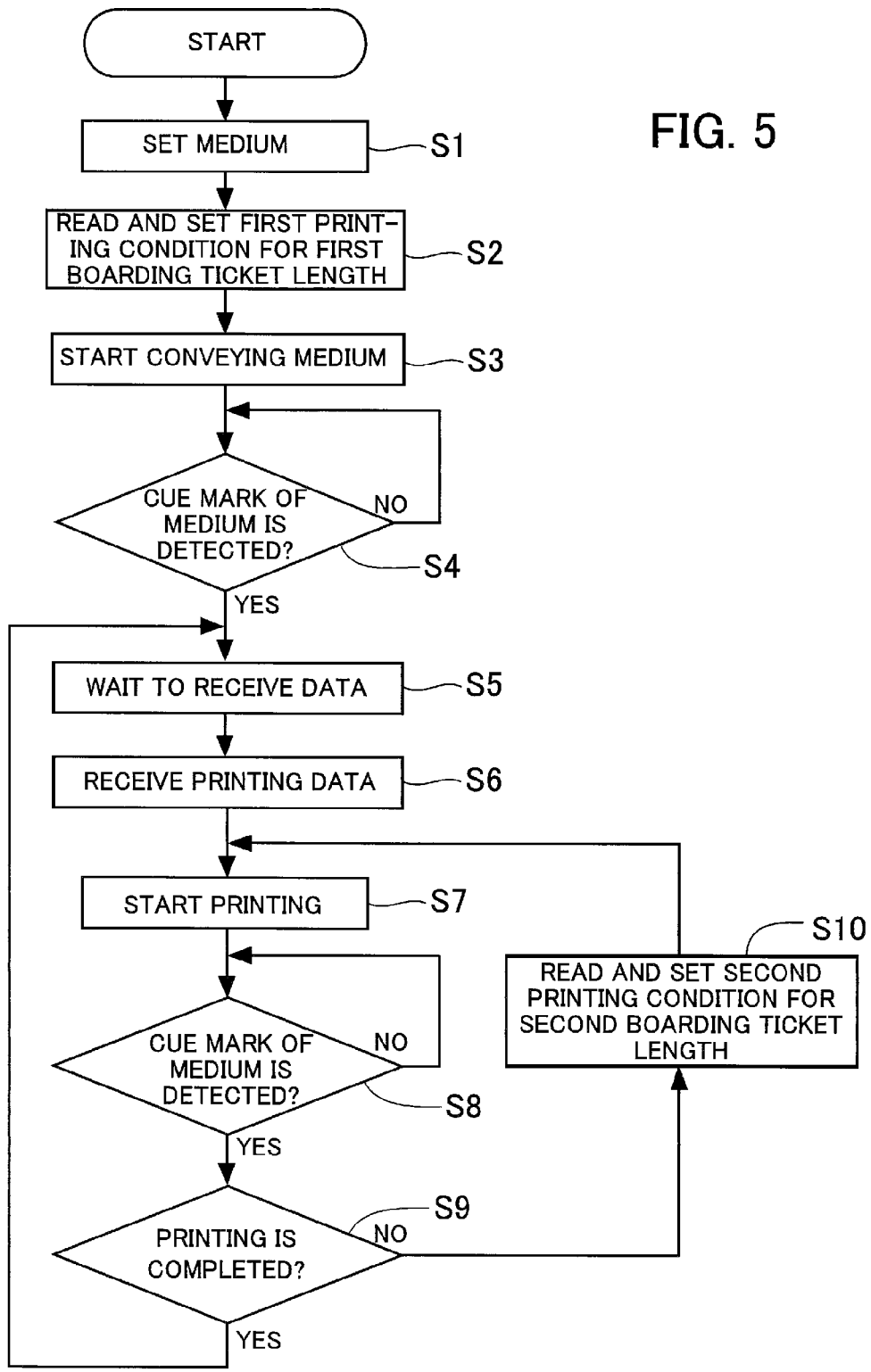
FIG. 5 is a flow chart illustrating the operational flow of the printer apparatus.
Figure 6:
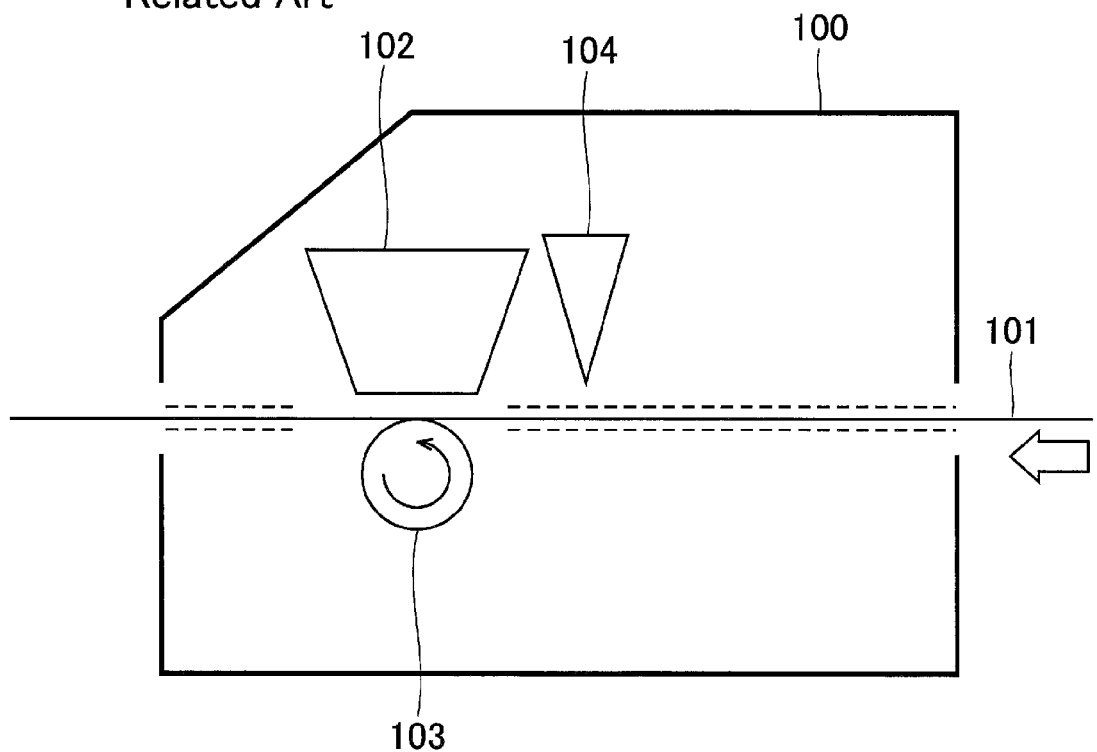
FIG. 6 is a cross sectional view illustrating the configuration example of an existing printer apparatus.
Figure 7:
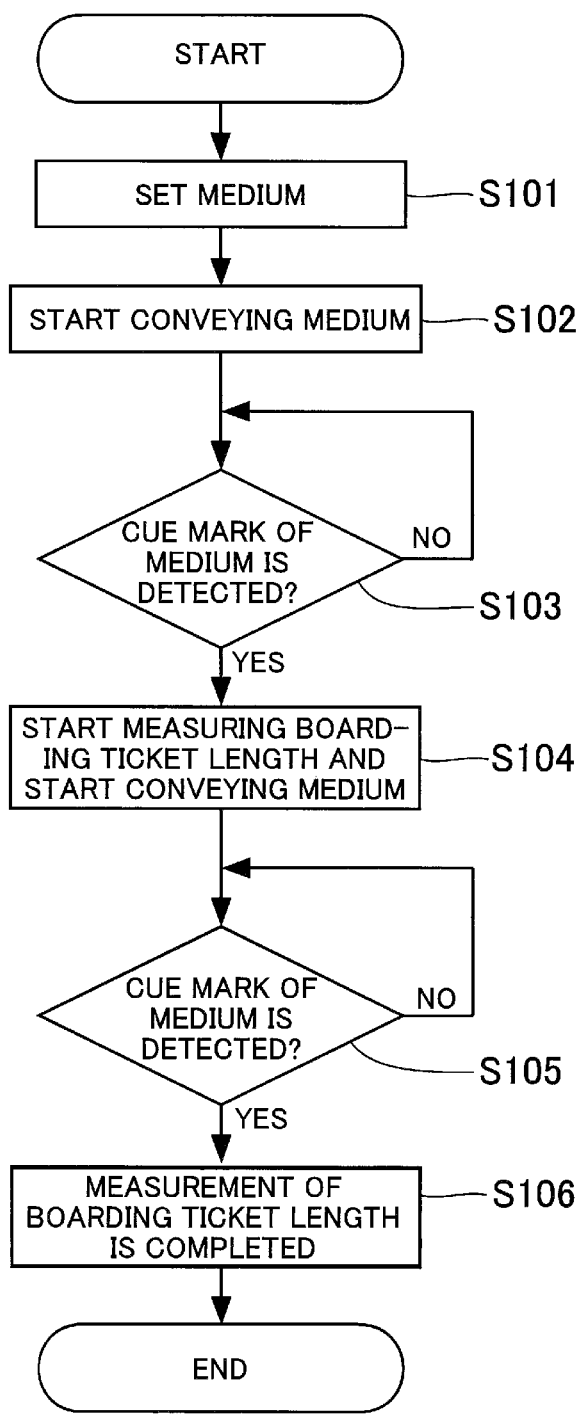
FIG. 7 is a flow chart illustrating the operational flow of the existing printer apparatus until it is set to a print-standby state.
Figure 8A:
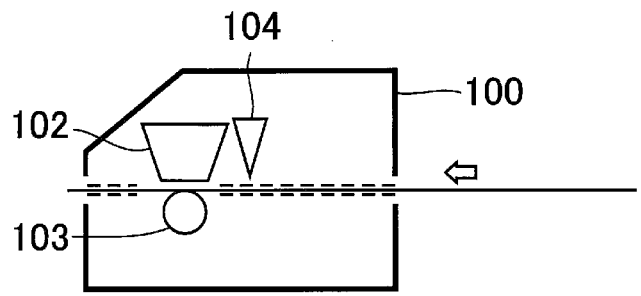
FIGS. 8A to 8D illustrate the operation of the existing printer apparatus until it is set to the print-standby state, where
Figure 8B:
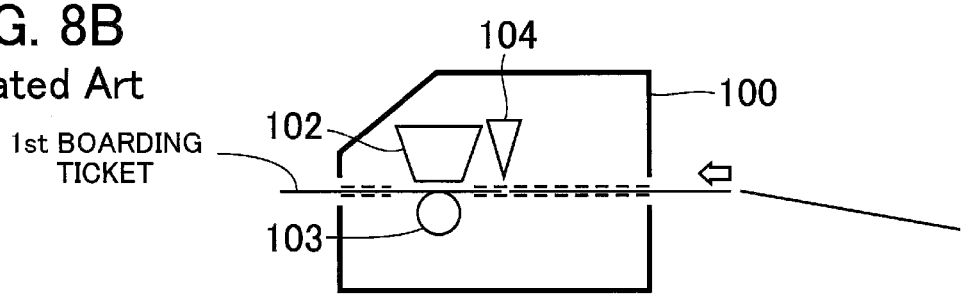
Figure 8C:
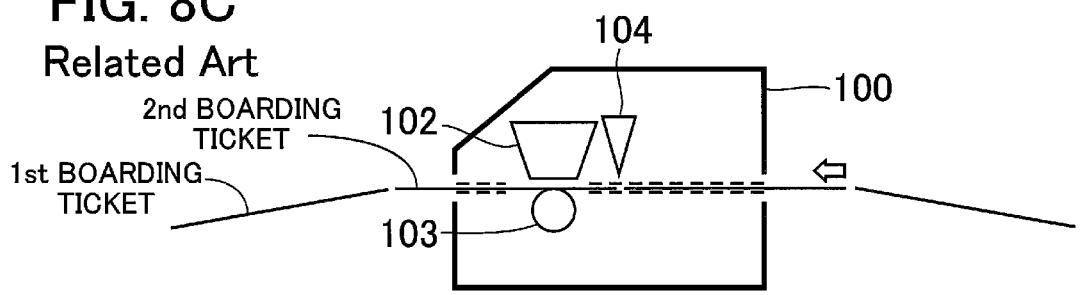
Figure 8D:
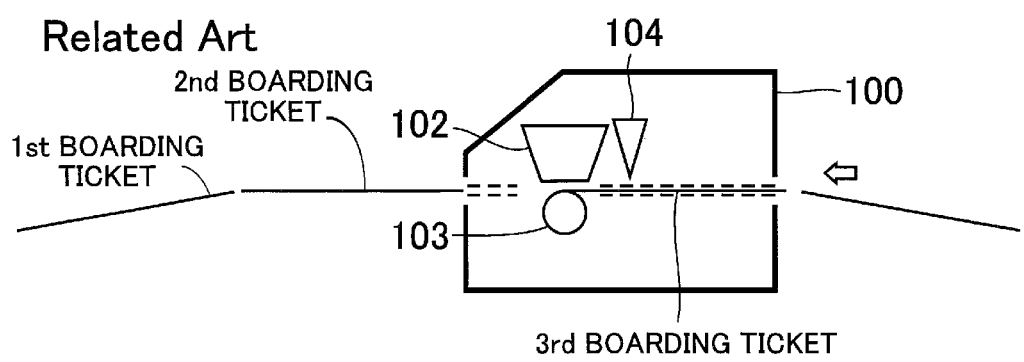

FIG. 4 is a block diagram illustrating one example of the hardware configuration of the printer apparatus used in the embodiment, and FIG. 5 is a flow chart illustrating the operational flow of the printer apparatus.

The printer apparatus 10 includes a main control unit 31 as the control unit configured to control the whole printer apparatus 10, as illustrated in FIG. 4. The main control unit 31 includes a microprocessor. The main control unit 31 is connected to a storage unit 32. The storage unit 32 includes a nonvolatile storage device, such as a flash memory, and a RAM (Random Access Memory). The nonvolatile storage device stores the program of an OS (Operating System), application programs, such as a print control program, the first printing condition for the first boarding ticket length, the second printing condition for the second boarding ticket length, and the like. The RAM is used as the main storage device of the printer apparatus 10. At least a part of the program of the OS and the application programs executed by the microprocessor of the main control unit 31 are temporarily stored in the RAM. Moreover, various types of data, such as the above-described first printing condition or second printing condition, needed for the processing by the microprocessor of the main control unit 31 are read and stored into the RAM.

A plurality of peripheral devices are connected also to the main control unit 31 via a bus 37. The peripheral devices include a conveyance unit 33 configured to control the medium conveying motor 23 of the platen roller 22, a printing unit 34 configured to control the print head 21, a sensor unit 35 configured to receive a detection signal from the sensor 24, and a communication line unit 36 configured to receive the printing data from the host apparatus.

The processing function of the embodiment may be realized with the hardware configuration including a computer that includes the microprocessor of the main control unit 31 and the storage unit 32 as described above. Note that, in the embodiment, a print control program describing the processing content of the function that the printer apparatus 10 needs to have is provided in a state of being stored in the storage unit 32. The print control program is executed by the computer, thereby realizing the above-described processing function on the computer.

Next, the operation of the printer apparatus by the print control program will be described with reference to the flow chart illustrated in FIG. 5.

Upon start-up of the printer apparatus 10, when the medium 3 is placed on the platen roller 22, the main control unit 31 receives a signal indicating detection of an area excluding the cue mark 1c or cue mark 2a of the medium 3 from the sensor 24, and determines that the medium 3 has been set (step S1). Then, the main control unit 31 reads the first printing condition for the first boarding ticket length from the storage unit 32, and sets the printing condition to the read first printing condition (step S2). Here, a specified printing condition is set to the first printing condition. This is because the boarding ticket 1 with the first boarding ticket length (3 in.) is employed by more airlines than the boarding ticket 2 with the second boarding ticket length (7+⅜in.).

Next, the conveyance unit 33 controls the medium conveying motor 33 to rotationally drive the platen roller 22, so that the main control unit 31 starts conveying the medium 3 (step S3). Next, the main control unit 31 determines whether or not the cue mark 1c or cue mark 2a of the medium 3 has been detected by the sensor unit 35 (step S4). Here, upon notification of the detection of the one mark 1c or cue mark 2a of the medium 3 from the sensor unit 35, the main control unit 31 sets the printer apparatus 10 to a data reception waiting state (step S5). That is, the main control unit 31 advances the head of the second boarding ticket 1 or boarding ticket 2 of the medium 3 to the position of the platen roller 22 and stops the conveyance, and sets the printer apparatus 10 to the print-standby state. Then, the fed first boarding ticket 1 or boarding ticket 2 is separated manually or by the cutter 25, and is discarded.

When the communication line unit 36 receives printing data transmitted from the host apparatus (step S6), the main control unit 31 controls the conveyance unit 33 and printing unit 34 so as to start printing rise received printing data onto an unprinted boarding ticket 1 or boarding ticket 2 in accordance with the first printing condition (step S7). Here, the main control unit 31 waits until the sensor unit 35 detects the cue mark 1c or cue mark 2a of the medium 3 (step S8).

When the sensor unit 35 detects the cue mark 1c or cue mark 2a of the medium 3, the main control unit 31 determines whether or not the printing is completed (step S9). If the printing is completed, the main control unit 31 returns to step S5 of data reception wait, and sets the printer apparatus 10 to the print-standby state. Here, the printed boarding ticket is the boarding ticket 1 with the first boarding ticket length (8 in.). The fed second boarding ticket 1 is separated manually or by the cutter 25. In the subsequent printing, printing will be performed under the initially-set first printing condition.

As described above, when the medium 3 of the printing condition that was set at the start-up of the printer apparatus 10 is set, only the first boarding ticket is discarded, and therefore wasting of boarding tickets when the medium is set may be reduced.

In steps S8 and S9, when the cue mark (here cue mark 2*a*) of the medium 3 is detected prior to the completion of printing, the main control unit 31 reads the second printing condition for the second boarding ticket length from the storage unit 32 and sets it as the printing condition (step S10). Then, the main control unit 31 advances the head of the third boarding ticket 2 of the medium 3 to the position of the platen roller 22 and stops the conveyance, sets the printer apparatus 10 to the print-standby state, and then returns to step S7 and re-prints the printing data under the re-set printing condition. Then, the fed second boarding ticket 2 is separated manually or by the cutter 25, and is discarded. In the subsequent printing, printing will be performed under the re-set second printing condition.

As described above, when the medium 3 of a printing condition different from the printing condition that was set at the start-up of the printer apparatus 10 is set, two boarding tickets will be discarded as in the conventional art. However, in view of the fact that the boarding ticket 2 of the second boarding ticket length (7+⅜in.) is less widely employed than the boarding ticket 1 of the first boarding ticket length (8 in.), the wasting of boarding tickets when the medium is set may be reduced in total.

In the printer apparatus with the above-described configuration and the control method and print control program for the printer apparatus, when the medium is of the first ticket length, the measurement of the ticket length when the medium is set is omitted, and therefore the discarding of tickets which were needed for measuring the ticket length may be advantageously eliminated.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A printer apparatus that performs printing for each unprinted ticket on a medium including a plurality of continuous unprinted tickets each having a first ticket length or a second ticket length shorter than the first ticket length, the printer apparatus comprising:
    a storage unit configured to store a first printing condition for the first ticket length and a second printing condition for the second ticket length;
    a sensor unit configured to detect a cue mark that is formed at a joint between adjacent unprinted tickets of the medium;
    a conveyance unit configured to convey the medium;
    a data receiving unit configured to receive printing data from a host apparatus;
    a printing unit configured to print the received printing data onto the unprinted ticket in accordance with the first printing condition or second printing condition stored in the storage unit; and
    a control unit configured to control the conveyance unit so as to start conveying the medium when the medium is set or when the data receiving unit receives the printing data and the printing unit starts printing, and so as to stop conveying the medium at a print waiting position of the medium when the sensor unit detects the cue mark, wherein:
        the control unit sets a printing condition to the first printing condition when the medium is set, starts printing the printing data under the set printing condition when the data receiving unit receives the printing data, and re-sets the printing condition to the second printing condition and prints the received printing data under the re-set printing condition when the sensor unit detects the cue mark prior to completion of the printing.

2. The printer apparatus according to claim 1, wherein the conveyance unit includes a mechanism for feeding the medium only forward.

3. The printer apparatus according to claim 1, wherein the conveyance unit conveys the medium with a platen roller that is arranged facing a print head of the printing unit.

4. The printer apparatus according to claim 1, further comprising a cutter unit configured to cut the medium along the joint between the adjacent unprinted tickets when the conveyance unit stops conveying the medium.

5. A control method for a printer apparatus, the method comprising:
    setting, by a processor, a printing condition to a first printing condition of a first ticket length when a medium including a plurality of continuous unprinted tickets is set to the printer apparatus;
    stopping, by the processor, conveying the medium at a print waiting position when the set medium is conveyed and a cue mark that is formed at a joint between adjacent unprinted tickets is detected;
    starting, by the processor, upon receipt of printing date, printing the received printing data under the first printing condition while conveying the medium;
    determining, by the processor, whether or not the cue mark has been detected prior to completion of the printing; and
    stopping, by the processor, conveying the medium, when the cue mark has been detected prior to completion of the printing, re-setting the printing condition to a second printing condition of a second ticket length shorter than the first ticket length, and starting printing the printing data under the second printing condition while conveying the medium.

6. A non-transitory computer readable storage medium storing a computer program that causes a computer to perform a procedure comprising:
    setting a printing condition to a first printing condition of a first ticket length when a medium including a plurality of continuous unprinted tickets is set to a printer apparatus;
    stopping conveying the medium at a print waiting position when the set medium is conveyed and a cue mark that is formed at a joint between adjacent unprinted tickets is detected;
    starting, upon receipt of printing data, printing the received printing data under the first printing condition while conveying the medium;

determining whether or not the cue mark has been detected prior to completion of the printing; and stopping conveying the medium, when the cue mark has been detected prior to completion of the printing, resetting the printing condition to a second printing condition of a second ticket length shorter than the first ticket length, and starting printing the printing data under the second printing condition while conveying the medium.

\* \* \* \* \*